Figure 1:
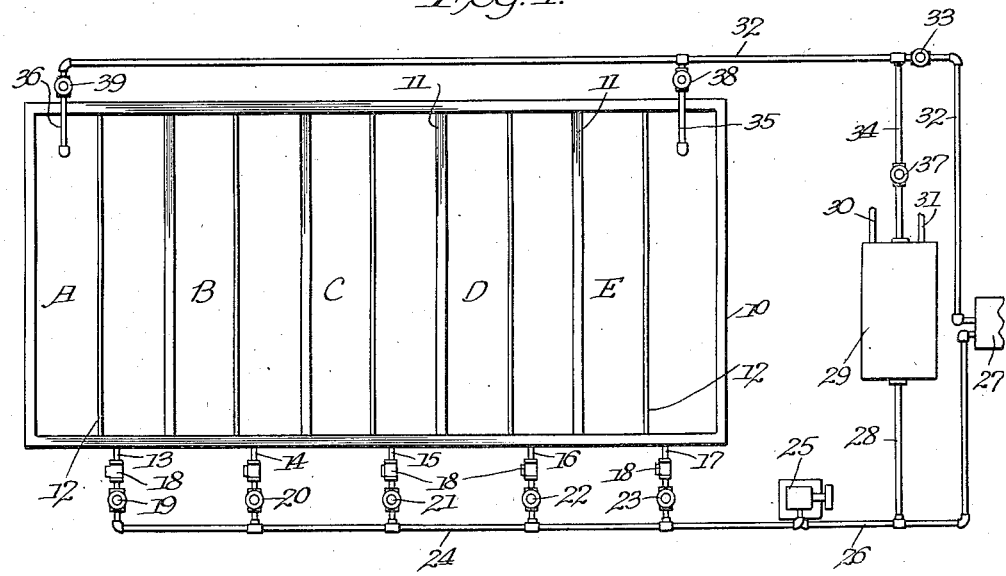

Oct. 16, 1934.    R. G. EWER    1,976,879

REFRIGERANT STORAGE MEANS

Filed March 28, 1934

Inventor

Roland G. Ewer

By F. W. Dahn,
Attorney

Patented Oct. 16, 1934

1,976,879

UNITED STATES PATENT OFFICE 1,976,879

REFRIGERANT STORAGE MEANS

Roland G. Ewer, Carbondale, Pa., assignor to The Carbondale Machine Company, Carbondale, Pa., a corporation of Pennsylvania Application March 28, 1934, Serial No. 717,815

7 Claims. (Cl. 62—101)

It is an object of my invention to provide means whereby a heat transfer device can be supplied over a considerable period of time with a heat transfer medium having a substantially constant initial temperature. Such a device has various fields of utility in the industrial arts, a specific use being in connection with the manufacture of beer, wherein wort-cooling is an intermittent operation with a heavy load at times which uses all the capacity of the refrigerating means, while between peak periods there is very much less call on the refrigerating machinery. Now if there be used for the cooling of wort such a means as that disclosed in the patent to Baer 1,944,056 it is possible to store refrigeration between peak periods for use in the middle section of the cooler of that apparatus. If such refrigeration is stored, for example, by cooling the contents of a storage tank for water, brine, or other liquid between peak loads, as by the action of the refrigerating machinery which would otherwise be idle at intermediate periods, then when the wort cooler is again placed in action and the cooling medium for the middle section begins to circulate the contents of the storage tank will gradually become warm throughout the tank, even though the storage tank contains a supply of cold liquid ample in quantity and of suitable temperature for treatment of the wort during a wort cooling period, hence there will not be a uniform cooling of the wort during the entire wort cooling period. This is due to the fact that the cold liquid from such a tank usually passes through the wort cooler and then returns to the tank at a higher temperature than it had when leaving the tank. Hence the temperature of the cold liquid in the tank rises uniformly throughout the wort cooling operation due to the heat absorbed from the wort and so the initial temperature of the cold liquid supplied to the wort cooler becomes higher and higher throughout the wort cooling period.

It is impractical to resort to refrigeration for cooling the storage tank, or to substitute such operation in place of using the storage tank, for the purpose of maintaining constant temperature of the liquid since the purpose in storing the cold liquid is to leave the refrigerating machine free to operate at full capacity on the direct refrigerant section of the wort cooler during the wort cooling period.

It is an object of my invention to provide storage means suitable for use in such a situation by the use of which cooling fluid can be supplied throughout the wort cooling period (or the peak load) at the same temperature all the way through such period, with advantages which will be obvious to those skilled in the art.

It will be understood, of course, that my apparatus and process are adapted for use in many other situations and for many other puposes besides the wort cooling operation above described.

Another object of the invention is to provide simple and inexpensive apparatus for the purpose described, which apparatus can be operated in simple and effective manner to effect my purpose.

Referring to the drawing, which is made a part of this application and in which similar reference characters indicate similar parts.

Fig. 1 is a plan of a preferred form of apparatus, and

Figure 2:
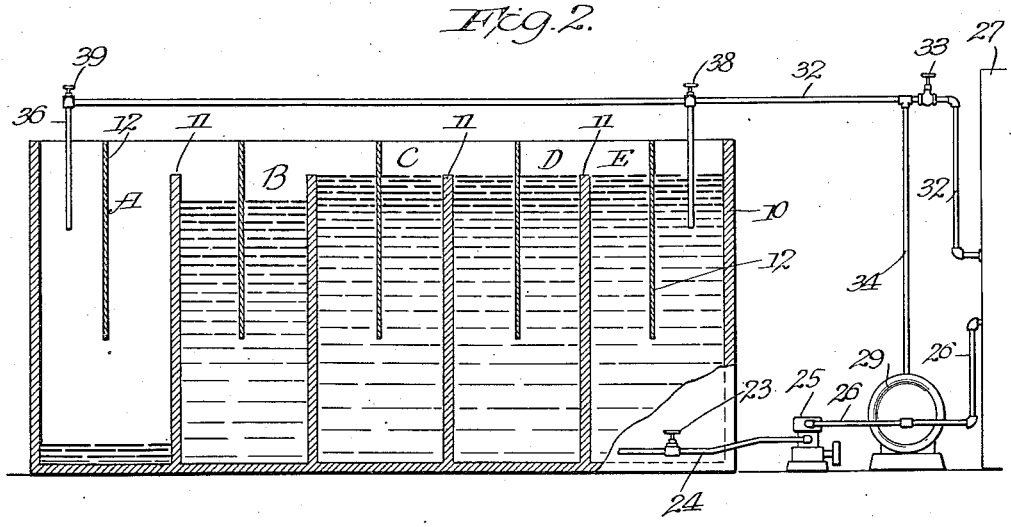

Fig. 2, an elevation of the same, partly in section.

In the drawing, reference character 10 indicates a tank which is provided with a plurality of partitions 11 extending from the bottom of the tank nearly to the top of the same, thus dividing the tank into a plurality of compartments. Any number of compartments may be provided but preferably the number is such that there is one more compartment than would be needed to hold enough cold liquid to supply the needs of the wort cooler during a wort cooling period. In addition to the lower partitions 11 there are preferably provided a series of upper partitions 12 extending from a point above the liquid level of the tank downward for a suitable distance for mixing the liquid when it flows lengthwise through the tank in certain instances as hereinafter described. In many instances however, partitions 12 are not necessary to proper operation of the device.

Adjacent the bottom of the tank there are provided outlet pipes 13, 14, 15, 16 and 17, i. e. one for each compartment and these outlet pipes are provided with check valves 18 which permit liquid to flow outward only from said compartments. In addition to the check valves each of the outlet pipes is provided with a stop valve which may be controlled either automatically or manually, these stop valves being indicated at 19, 20, 21, 22, 23. Beyond the check valves each outlet pipe leads into a main pipe 24, said pipe 24 leading to a pump 25 connected by a pipe 26 to a heat transfer device 27, which in this instance is illustrated as corresponding to the header shown at 13', in the patent to Baer, above referred to. A branch pipe 28 leads from pipe 26 to a temperature restoring device 29 for the cold liquid of the tank. This device, in the illustrative instance of a 3-step cooler, is cooled by the refrigerating machine which is suitably connected to the device 29 through pipes 30 and 31, one of which is an inlet for ammonia or the like from the refrigerating machine and the other is an outlet for the same.

A return pipe 32 leads from the heat transfer device 27 back to the multiple compartment tank, a valve 33 being provided in said pipe for a purpose hereinafter described. A branch pipe 34 leads from the temperature restoring device 29 into pipe 32. Branch pipes 35 and 36 lead from pipe 32 into the end compartments of the tank, which compartments are marked "A" and "E" for convenience of description, the intermediate compartments being marked "B", "C" and "D". Valves 37 and 38 and 39 serve respectively for controlling the branch pipes 34, 35 and 36.

In the operation of my device, for the purpose; e. g. of cooling wort in connection with a heat transfer unit of the type referred to, Fig. 2 may be taken as illustrating the condition of affairs during an idle period, i. e. when the refrigerating machine is not needed for service in connection with the ammonia section of the wort cooler. At this time the refrigerating machine is connected to the cooler 29, the compartment A is empty or substantially so and the remaining compartments are full, or substantially so. Valves 20, 37 and 39 are open while valves 19, 21, 22, 23, 33 and 38 are closed. The pump being operated by any suitable means, liquid is now drawn from the compartment B by pump 25 and passes through branch pipe 14, pipes 24, 26 and 28, temperature restoring device 29, pipes 34 and 32 and branch pipe 36, being discharged into compartment A. This continues until compartment B is substantially empty, whereupon valve 20 is closed and valve 21 is opened. Now the liquid will be drawn from compartment C through the cooling apparatus, as above described, and the cooled liquid being still discharged into compartment A will cause this compartment to overflow, the cold liquid passing over the lower partition between compartments A and B into compartment B. By the time that compartment B is full, or substantially so, compartment C will be substantially empty, whereupon valve 21 will be closed and valve 22 opened and this operation will be continued until compartment E is emptied. If the temperature of the liquid has been sufficiently reduced, the cooling operation may then cease; otherwise, the cycle may be repeated as often as necessary in order to develop the desired low temperature in the cold liquid or if preferred the circulation may be continued through branch pipe 17, pipes 24, 26 and 28, device 29 and pipes 34, 32, and 36, the colder fluid being continuously delivered to compartment A and overflowing to compartments B, C, D and E in their order. In such case partitions 12 serve to thoroughly mix the colder fluid in each compartment.

When wort cooling is to be resumed, compartment E being now empty and the remaining compartments full, valves 19, 20, 21, 23, 37 and 39 will be closed and valves 22, 33, 38 will be opened. The pump 25 being in operation and the refrigerating machine being cut off from temperature restoring device 29 (as it now has to serve the direct refrigeration section of the wort cooler) the cooling fluid will circulate through branch pipe 16, pipes 24 and 26, heat transfer device 27, pipe 32, and branch pipe 35, being discharged into empty compartment E. When compartment D is empty, or substantially so, valve 22 will be closed and valve 21 opened whereupon the circulation will continue, the compartment C being now gradually emptied while the liquid delivered to compartment E will overflow into empty compartment D, and so on through the length of the tank or so much thereof as may be utilized during a wort cooling period. Obviously any compartment may be left empty at the end of a wort cooling period or at the end of a cooling period for the liquid in the tank, the capacity of the tank being preferably so chosen, as above stated, that it will suffice for a wort cooling period. As a result of this each part of the wort will be treated with cooling liquid of the same temperature as is used for every other part or, in other words, there will be a substantially constant initial cooling temperature applied to the wort at all times. It will be noted that the pumping from the various compartments proceeds in like manner whether the cooling liquid in the tank is being used for wort cooling or whether it is being treated for storage of refrigeration but the sequence may occur either in the same direction or in opposite directions. In any event the warm liquid from the wort cooler is never mixed with the cold liquid remaining to be pumped to the wort cooler nor is the warm liquid in the tank ever mixed with the cold liquid which is being returned to it from the temperature restoring device 29 when refrigeration is being stored.

Suitable insulation may of course be used for the main tank and also for any or all of the partitions if found desirable.

It will be obvious to those skilled in the art that many changes in the structure of the device and in its use may be made without departing from the spirit of the invention. While the device is well suited for use with a 3-step wort cooler such as is shown in the patent to Baer above referred to it can be used with other wort coolers and also in other places where a supply of cold fluid is to be furnished at substantially constant initial temperature to any heat transfer device for cooling any substance or, in fact, where a heating fluid is to be stored for the raising of temperature instead of the lowering of temperature essentially similar mechanism may be employed. It may be noted that if it should appear desirable to empty the storage compartments in the same sequence at each wort cooling period or analogous operation it is a simple matter to manipulate the proper valves and transfer liquid from a full compartment to an empty one, so as to start always with the same compartment empty and the others full.

Having thus fully described my said invention, what I claim as new and desire to secure by Letters Patent is:

1. A device for supplying cooling fluid to a heat transfer mechanism at substantially constant initial temperature, comprising a multiple compartment tank, a device for cooling the fluid in said tank, pipes for connecting individual compartments of said tank to a heat transfer device or to said cooling means, pumping means connected to said pipes, and valves in said pipes whereby fluid may be circulated through said heat transfer means and back to an empty compartment of the tank or alternatively may be circulated from successive compartments of the tank through the cooling means and back to an empty compartment for storing refrigeration in the tank.

2. A device for supplying cooling fluid to a heat transfer mechanism at substantially constant initial temperature, comprising a multiple compartment tank, a fluid cooling device, interrelated pipes for connecting the tank to a heat transfer mechanism and to the fluid cooling device, pumping means connected to said pipes, and valves in said pipes whereby fluid from successive compartments may be circulated either through said heat transfer device or through said cooling means and back to an empty compartment of said tank.

3. A device for supplying cooling fluid to a heat transfer mechanism at essentially constant initial temperature, comprising a tank divided into compartments by partitions lower than the top of the tank whereby fluid supplied to the tank at one end may overflow from one compartment to another in succession, a cooling device, pipes for connecting the respective compartments to a heat transfer mechanism and to the cooling device, pumping means for forcing fluid through said pipes, pipes for connecting the cooling device and the heat transfer mechanism to the end compartments of the tank, and valves in said pipes whereby the fluid may be caused to flow from successive compartments of the tank through either the cooling means or the heat transfer mechanism and back to an end compartment of the tank.

4. A device as in claim 3, said tank having between said first-named partitions other partitions extending from the top of the tank downward below the normal level of liquid in the tank.

5. In a device for supplying cooling fluid at substantially uniform temperature to a heat exchange device, the combination of a heat exchange device, fluid storage means including a series of storage compartments, means whereby cooling fluid may be circulated from successive compartments of the series to said heat exchange device and the warmed fluid returned therefrom to the emptied compartments, means for restoring the circulating fluid to its normal low temperature, means for stopping circulation through the heat exchange device and means for circulating the stored warmed fluid through the temperature restoring means and back to the compartments successively.

6. In a mechanism for supplying fluid at substantially constant initial temperature to a heat exchange device, the combination of fluid storage means including a series of storage compartments, means whereby fluid of predetermined temperature may be circulated from successive compartments of the series through a heat exchange device for altering the temperature of material under treatment thereby and then back to the emptied compartments of the series, a temperature restoring device, and means whereby the circulation may first be cut off from said heat transfer device, and then caused to pass through the temperature restoring device for bringing the fluid back to such predetermined temperature and to the emptied storage compartments.

7. In a mechanism for supplying fluid at substantially uniform initial temperature periodically to a heat exchange device, the combination of a heat exchange device, a temperature restoring means, a series of storage compartments, means for passing stored fluid from successive compartments of the series through said temperature restoring means to establish a predetermined temperature therein and to empty compartments of the series for storage, and means for alternatively passing the stored fluid from individual compartments in succession through the heat exchange device and back to empty compartments of the series.

ROLAND G. EWER.